US006755738B2

(12) United States Patent
Glasson et al.

(10) Patent No.: US 6,755,738 B2
(45) Date of Patent: Jun. 29, 2004

(54) BINGO GAME

(75) Inventors: Naomi Glasson, Lane Cove (AU); Philippa Graham, Lane Cove (AU); Amanda Emmett, Lane Cove (AU); Colin Fong, Lane Cove (AU); Christopher Stevens, Lane Cove (AU)

(73) Assignee: Aristocrat Technologies Australia Pty Ltd., Lane Cove (AU)

( * ) Notice: Subject to any disclaimer, the term of this patent is extended or adjusted under 35 U.S.C. 154(b) by 51 days.

(21) Appl. No.: 10/144,407

(22) Filed: May 10, 2002

(65) Prior Publication Data

US 2002/0177478 A1 Nov. 28, 2002

(30) Foreign Application Priority Data

May 11, 2001 (AU) ............................................ PR 4934

(51) Int. Cl.[7] ................................................ A63F 13/00

(52) U.S. Cl. .......................... 463/19; 463/25; 273/269; 273/138.2

(58) Field of Search ............................... 463/17–19, 25, 463/22, 40–42, 29, 16; 273/138.1, 138.2, 269, 271

(56) References Cited

U.S. PATENT DOCUMENTS

| | | | | | |
|---|---|---|---|---|---|
| 4,252,322 | A | * | 2/1981 | Orter | 273/269 |
| 5,297,802 | A | * | 3/1994 | Pocock et al. | 463/19 |
| 5,624,119 | A | * | 4/1997 | Leake | 463/19 |
| 5,727,786 | A | * | 3/1998 | Weingardt | 273/269 |
| 5,830,067 | A | * | 11/1998 | Graves et al. | 463/40 |

* cited by examiner

*Primary Examiner*—Jessica Harrison
*Assistant Examiner*—Aaron Capron
(74) *Attorney, Agent, or Firm*—Morrison & Foerster LLP

(57) ABSTRACT

A gaming machine 10 has a display 14 and a game controller arranged to control images displayed on the display 14. The game controller is operable to play a game 16 of bingo wherein the display 14 displays a plurality of bingo cards simultaneously, at least one of the bingo cards being selected by a person playing the game in order for that person to play the game of bingo.

15 Claims, 7 Drawing Sheets

BINGO GAME

CROSS REFERENCE TO RELATED APPLICATION

This application claims priority to Australia Patent Application No. PR4934, filed May 11, 2001, the entirety of which is incorporated by reference.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being operable to play a game of bingo, the gaming machine being characterised in that the display means displays a plurality of bingo cards simultaneously, at least one of said bingo cards being selected by a person playing the game in order for that person to play the game of bingo.

The game control means may cause a representation of a bingo player to be displayed in association with each one of the bingo cards, the bingo players preferably being represented as animations on the display means.

The person playing the game (referred to below as "the game player") may select at least one bingo player to represent the game player in the bingo game. If desired, the game player may choose more than one bingo card by choosing more than one bingo player. The number of bingo players chosen may be governed by the number of credits wagered, e.g. for one credit, one bingo player may be chosen, for two credits, two bingo players may be chosen, etc.

Preferably, all the bingo cards in the bingo game are displayed simultaneously and may be viewed by the game player. The game control means may generate a bingo card for each bingo player, the bingo cards having the indicia marked on them. The indicia on each bingo card may be arranged in a matrix. The playing of the bingo game may require the same pattern of indicia always to be completed to constitute a bingo game-winning result. In other words, the game player may not have any option as to which pattern of indicia is to be completed. In this embodiment, the pattern of indicia to be completed may be that all the indicia on the card need to be marked off. Instead, in another embodiment, as an initial step in the playing of the game, the game player may be required to select a predetermined pattern of indicia to apply to the bingo cards, the pattern of indicia on all the displayed bingo cards then being the same. It is to be noted that the pattern of indicia available to be selected may include one where all the indicia on the card are required to be marked off.

Prior to displaying the indicia, the game control means may select the prize and cause a representation of the prize to be displayed on the display means together with a number of credits.

The bingo player selected by the game player to represent the game player may be distinctively highlighted on the display means to indicate its role as representing the game player. More particularly, the bingo card of the bingo player representing the game player may be highlighted, for example, by being surrounded by an animation of a ring of flashing lights.

A prize may be awarded if the pattern of indicia on the game player's card is completed, i.e. all the indicia in the pattern have been marked off, before the completion of the same pattern of indicia on any of the other, non-selected cards. Instead, a prize may be awarded if the pattern of indicia on the game player's card or, possibly, any bingo player's card, is completed within a predetermined number of bingo indicia draws.

Further, a consolation prize may be awarded to the game player if another bingo player's pattern of indicia is completed before any indicia have been marked off on the game player's card. The relevant prize or consolation prize may be a number of credits or another feature.

Preferably, an animated bingo game caller is displayed on the display means. During the bingo game, the game caller may be displayed in an animated form selecting bingo indicia.

An indicia board may also be displayed on the display means and as each bingo indicium, being a bingo number, is drawn during the game, the indicia board indicates the bingo indicium drawn. The indicium board, or number board, therefore effectively maintains a list of all previously drawn bingo numbers.

Each bingo indicium may be carried on a representation of a ball. A set of balls carrying the bingo indicia may also include at least one ball carrying a special function operator. The special function may be at least one of a multiplier function and a wild function. The multiplier ball may have the effect of multiplying the prize that results if the selected bingo player gets bingo first. The wild ball may cause one of the number positions on each card to be randomly chosen and marked off.

As each bingo indicium is drawn throughout the game, a matching indicium on the game player's bingo card may be marked to indicate a successful match and the awarding of a prize. If the same indicium appears on any of the other displayed, non-selected cards, those bingo cards may also be appropriately marked although no prize is awarded for the marking off of any indicia on the non-selected cards.

A prize may be awarded for each bingo indicium which is drawn and which corresponds to an indicium on the selected bingo card.

BRIEF DESCRIPTION OF THE DRAWINGS

The invention is now described by way of an example with reference to the accompanying drawings in which.

DETAILED DESCRIPTION OF THE DRAWINGS

Figure 1:
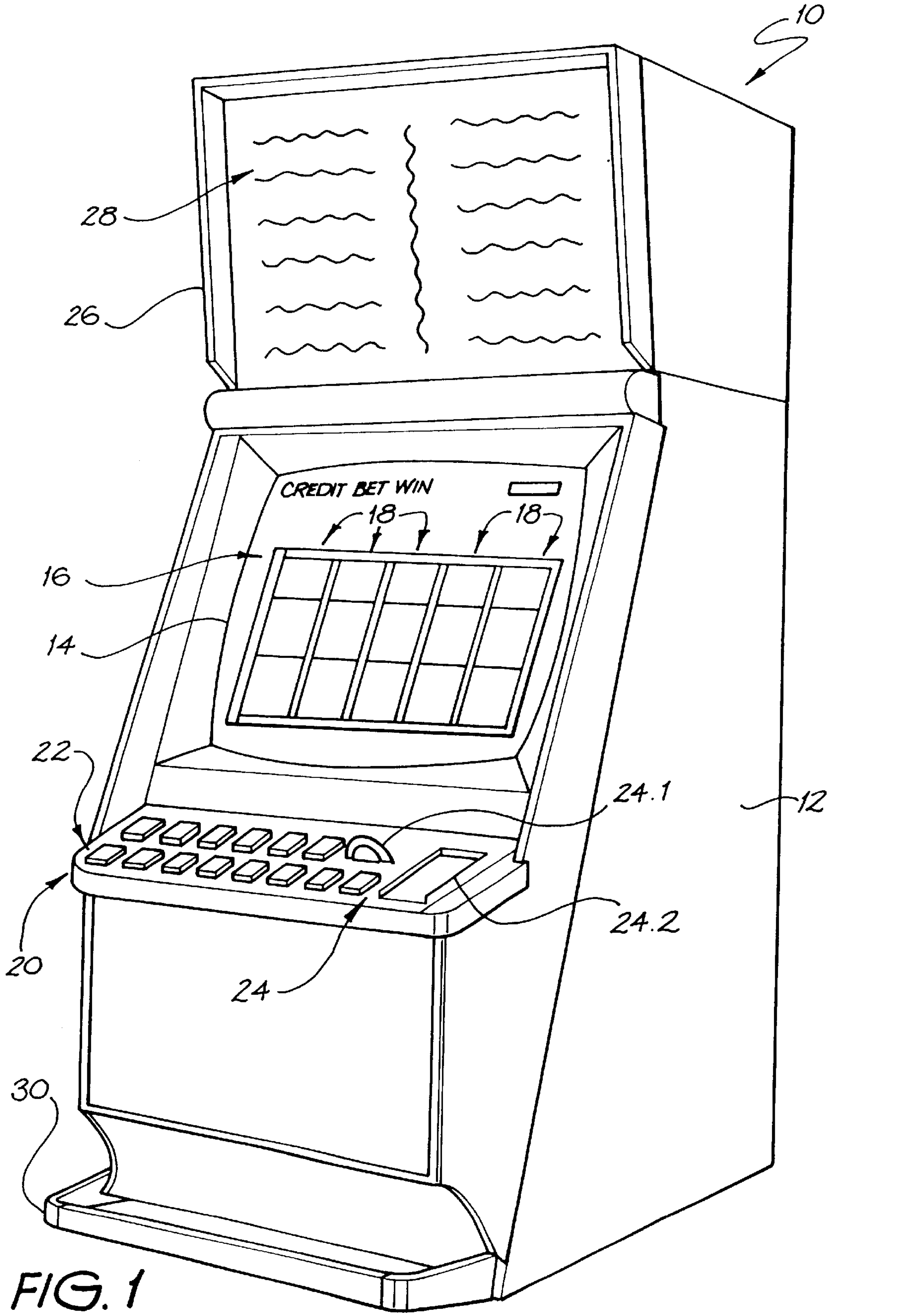
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a base game 16 is played, in use. The base game 16 is a spinning reel game which simulates the rotation of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
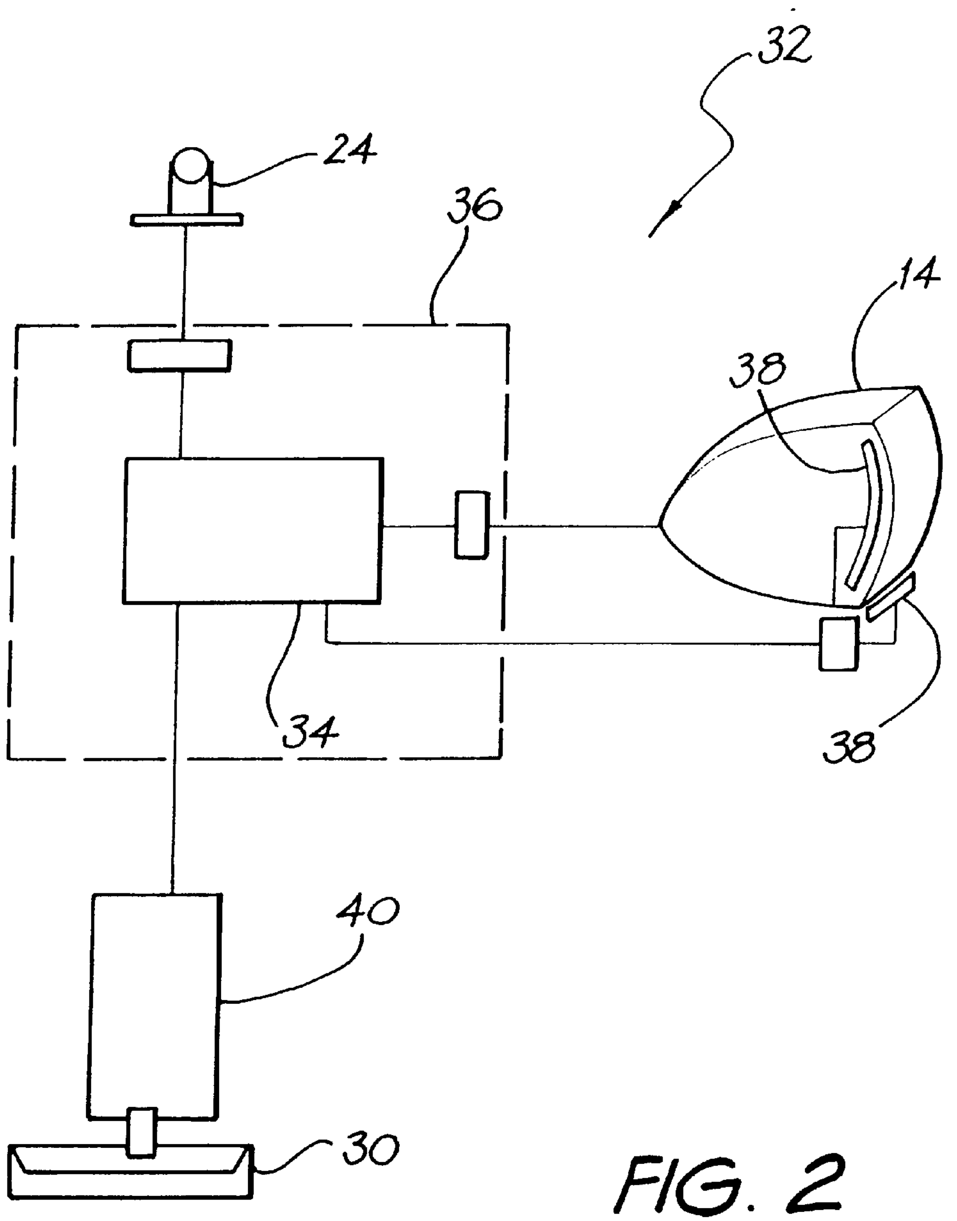
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

In this invention, a bingo game occurs as a second screen feature game following the occurrence of a trigger condition in a base game such as a spinning reel game. The trigger condition is a scatter win, such as the presence of three scatter symbols in the base game. The present invention is not necessarily limited to a second screen feature game and may be played as a base game itself.

Figure 3:
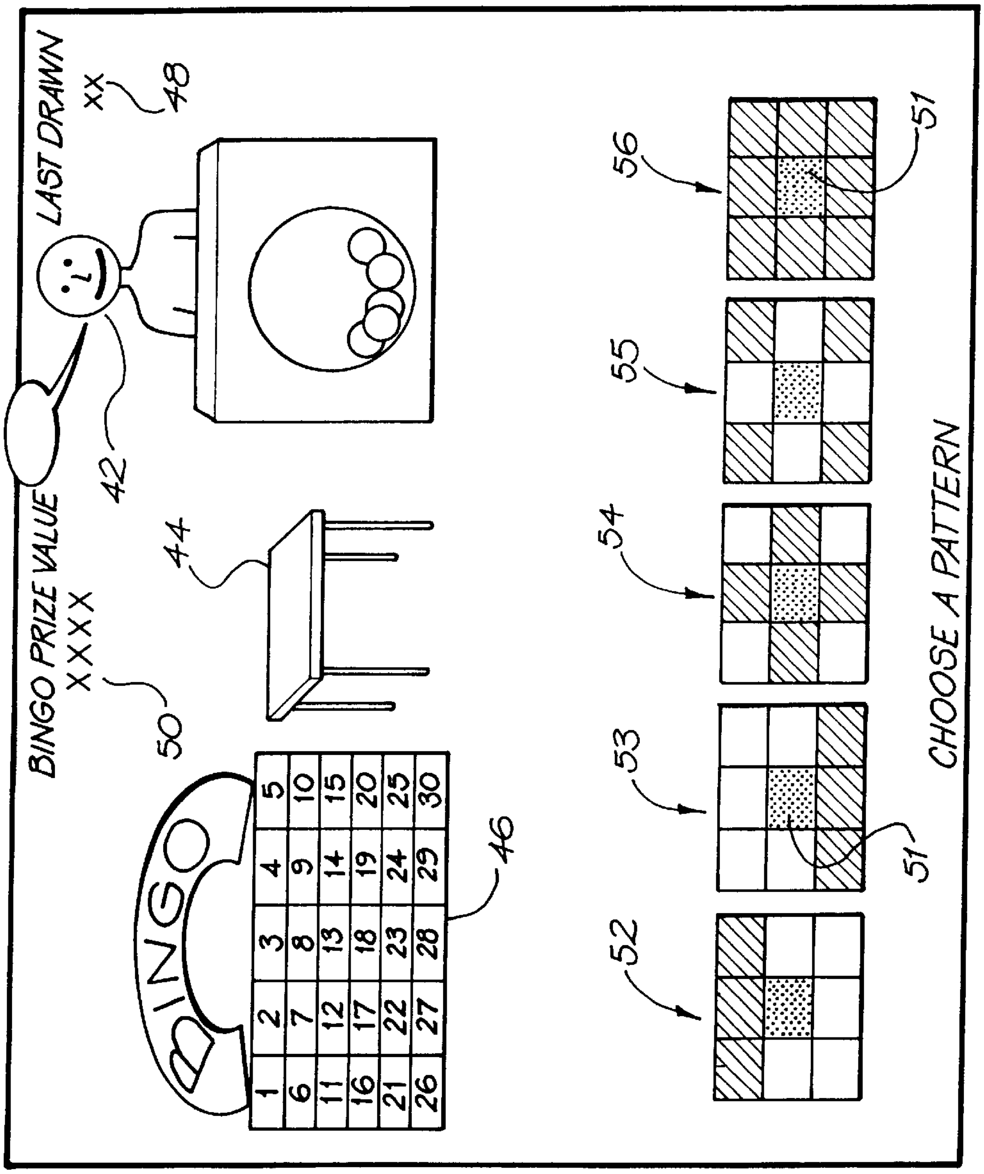
FIG. 3 shows an initial screen display of a feature bingo game according to the present invention.

With reference to FIG. 3 of the drawings, an initial screen display of a bingo game according to the present invention is illustrated. An animated character acts as a caller 42 of the bingo game. An animation of a prize table 44, a bingo number board 46 for displaying drawn bingo indicia or bingo numbers, a last indicium or number drawn indicator 48 and a bingo prize value indicator 50 are displayed in the screen display.

in a first embodiment of the invention, the entire card may need to be completed in order to win the bingo game, rather than the game player having to select a pattern of indicia on the card which needs to be completed. Hence, the game player need only choose which card the game player thinks is likely to win, the choice being made as described below with reference to a second embodiment of the invention. In this case, if bingo occurs on the selected card in fewer than 20 balls, a prize is awarded which is governed by the number of balls required for bingo to be achieved, more particularly, the fewer the balls, the higher the prize.

In a second embodiment of the invention, a game player is presented with five bingo card patterns of indicia 52–56 as shown in FIG. 3 of the drawings. The game player selects the pattern of bingo card indicia 52–56 to be completed. The particular pattern selected at this stage will be used for the remainder of the bingo game.

As part of the invitation to the game player to select the pattern, the caller 42 may be animated to indicate facial expressions whilst the controller 36 of the gaming machine 10 causes the words "choose your pattern" to be audibly played to the game player.

The game player selects a pattern by means of an appropriate button on the bank 22 of buttons. The game player has selected a pattern corresponding to 53 from the patterns of indicia 52–56 displayed in FIG. 3. No numbers are displayed on the cards yet. A middle square 51 of each card is wild.

Figure 4:
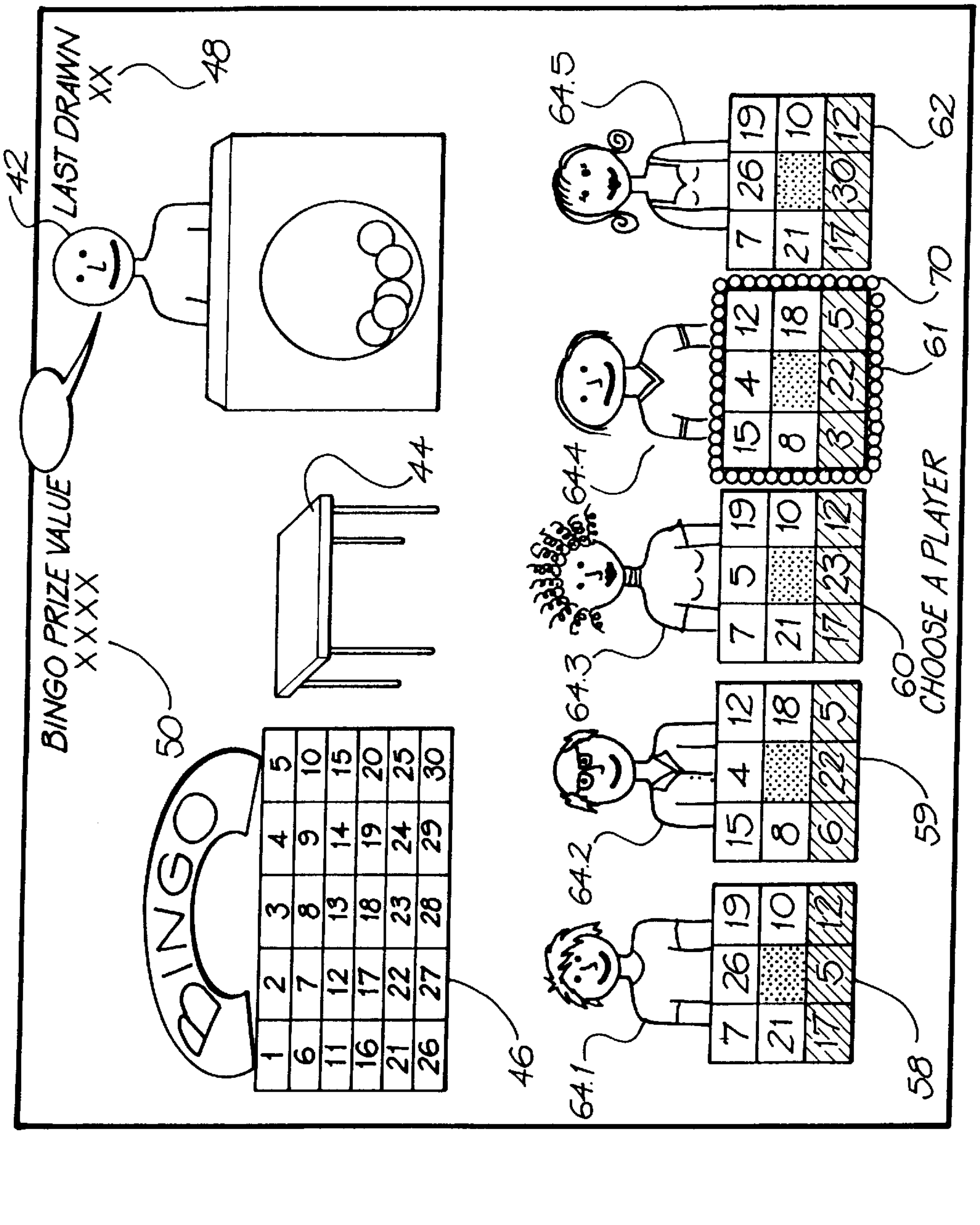
FIG. 4 shows a second screen display of the bingo game.

Having chosen the pattern 53, the game player is presented with a screen display as illustrated in FIG. 4 of the drawings where bingo cards 58 to 62 having numbers are displayed. The numbers are selected randomly from a predefined range of numbers. In this case, the range is 1 to 30. Each bingo card 58 to 62 has its numbers drawn from a separate set without replacement so that each number is equally likely to appear on each card but no number will appear more than once on each card. At this stage of the game, five characters 64.1 to 64.5 are displayed as bingo players in close proximity to the displayed bingo cards 58 to 62. The characters 64.1–64.5 are preferably animated. Each of the bingo cards 58 to 62 now carries the same pattern although the numbers on the bingo cards differ.

The game player is invited to select one of the animated characters 64.1–64.5 associated with each bingo card 58 to 62.

The game player selects the character 64.4 corresponding to bingo card 61 as the bingo player that will represent the game player during the bingo game by means of a button of the bank 22 of buttons. Having selected the representative bingo player 64.4 that bingo player's card is highlighted with an animated ring of flashing lights 70 displayed around the selected bingo player's bingo card 61.

Figure 5:
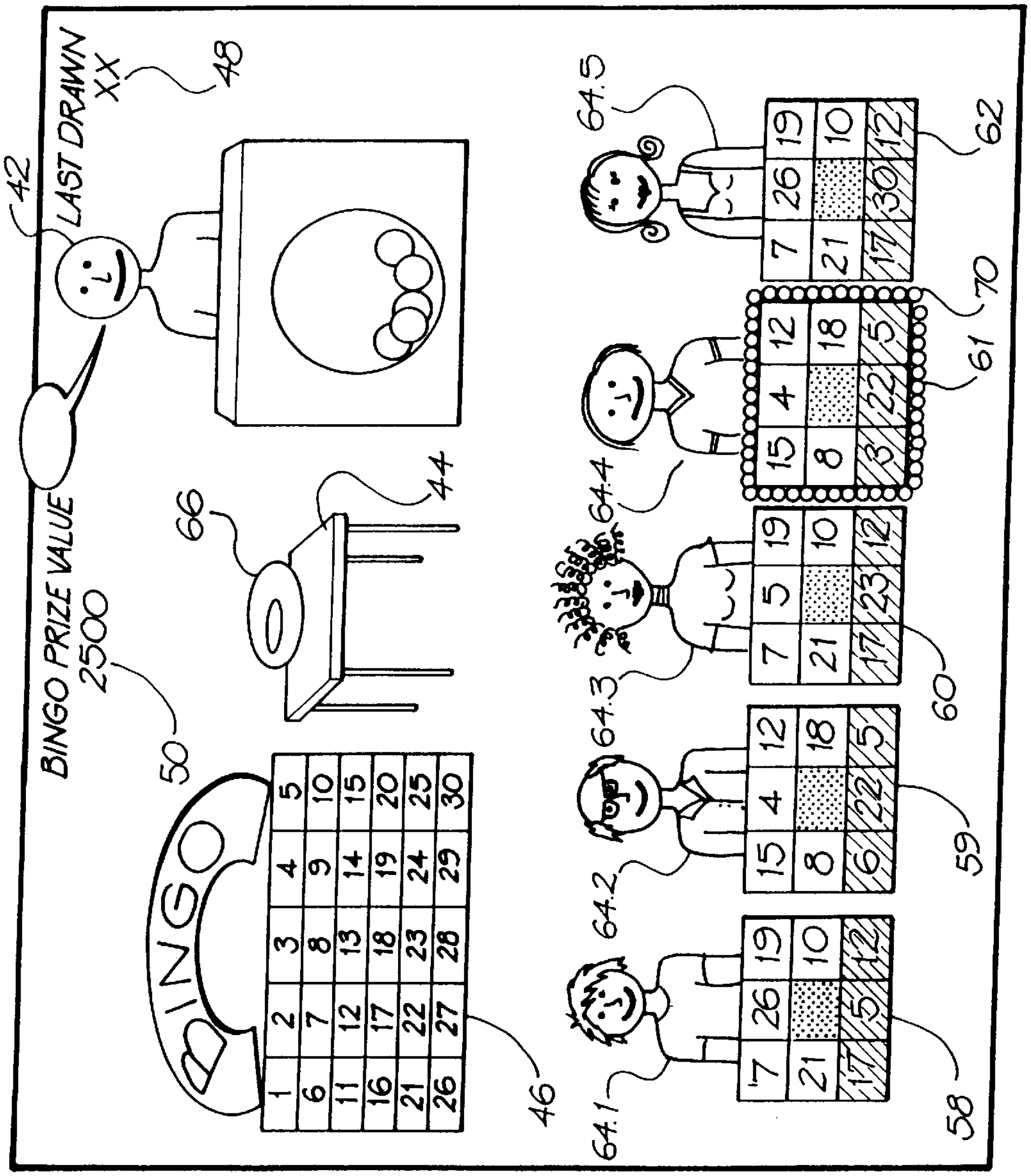
FIG. 5 shows a third screen display of the bingo game.

Having selected the bingo player 64.4, the game progresses to the display of FIG. 5 of the drawings. A screen display is illustrated wherein a bingo prize value for the game 16 is selected by the controller 36 and is displayed on the screen at 50. Additionally, a randomly selected bingo prize having the value displayed at 50 is selected and an animation representing the prize 66 is displayed on the table 44. At this stage, the bingo game is ready to commence and the caller 42 announces the start of the game. The prize may be an amount of credits or may be a secondary feature such as a number of free games with multiplier amount or entry to a further second screen feature.

Figure 6:
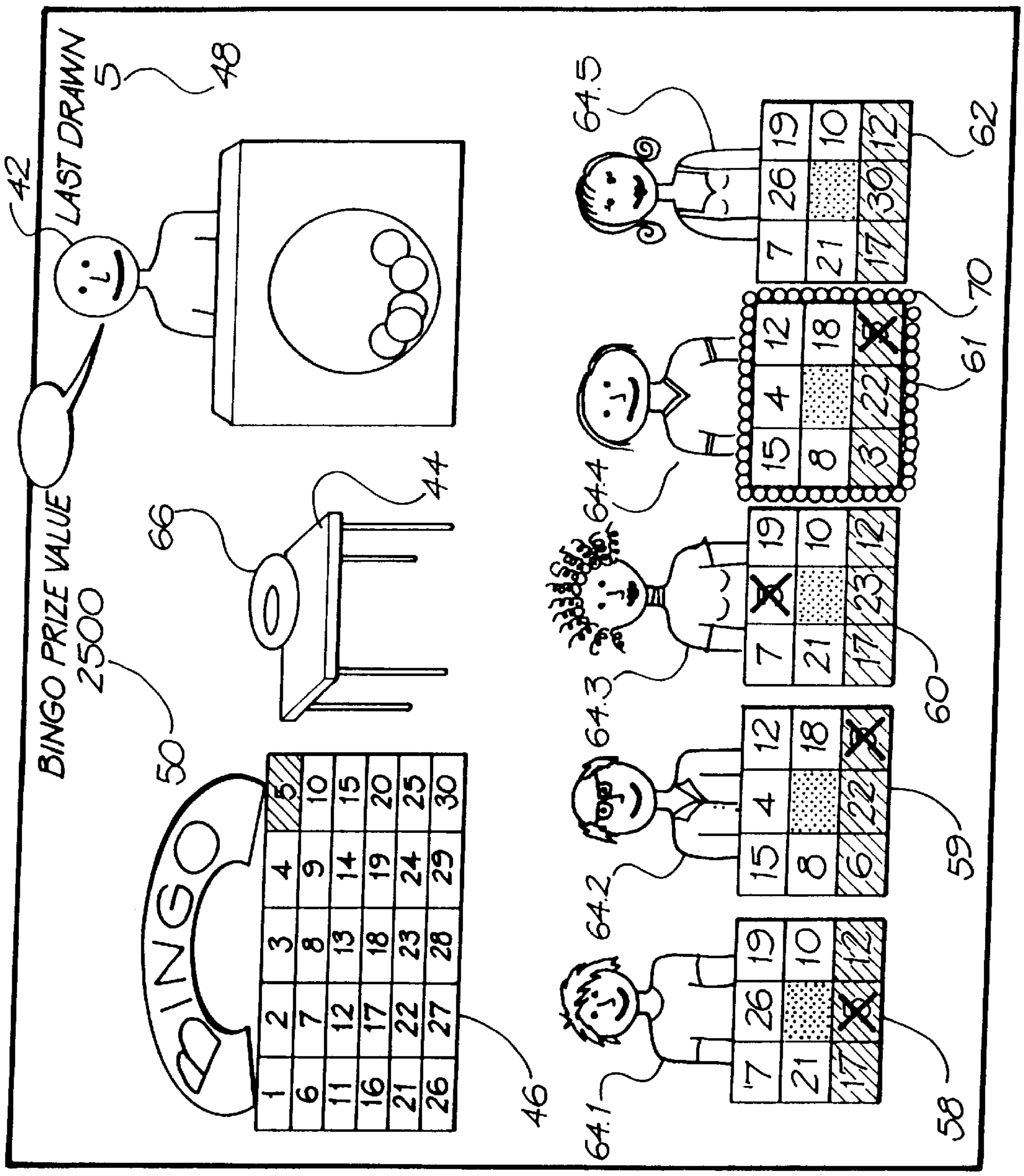
FIG. 6 shows a fourth screen display of the bingo game.

FIG. 6 shows a subsequent screen display after the caller 42 has drawn a first numbered bingo ball. In the example of FIG. 6, the first ball drawn carries the indicium, or number, "5" and, accordingly, the corresponding square is shaded on the bingo number board 46. The number "5" is also displayed on the screen as the last drawn number 48. As the game progresses and further numbered bingo balls are drawn, the number board 46 will display those numbers. As each ball is being drawn, the gaming machine 10 emits sounds corresponding to the sounds typically heard when a number of bingo balls are mixed in a barrel. The display of FIG. 6 includes an animation of bingo balls being mixed in a barrel-like container. It is to be noted that the bingo balls are drawn without replacement so that no numbers can be drawn more than once.

As can be seen in FIG. 6, the number "5" appears on the bingo card 61 of the selected bingo player 64.4. The number "5" is marked off on the game player's card as well as all the other cards on which the number "5" appeared. As a result of the game player having the number "5" on his or her card, the drawing of ball number "5" causes the game player to win a prize. Thus game players may win prizes for draws of individual bingo balls for which there is a corresponding bingo ball number marked on their bingo card. The prize may be randomly selected from a range of prizes. It is to be noted that this feature may also apply to the first embodiment of the invention described above.

Figure 7:
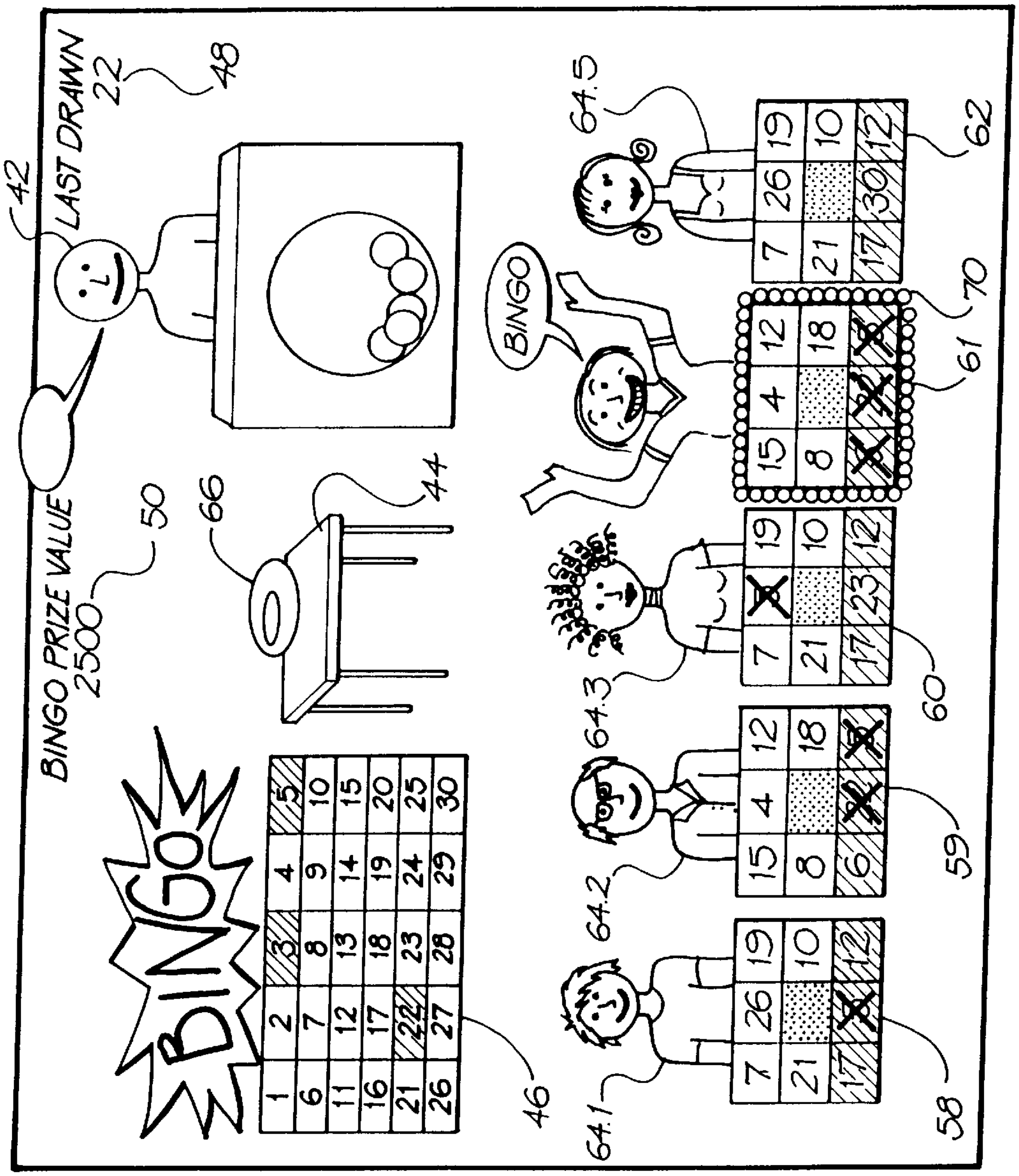
FIG. 7 shows a fifth screen display of the bingo game.

FIG. 7 illustrates a screen display of a finished bingo game wherein the bingo player 64.4, the player selected by the game player, wins the bingo prize for having marked off entries "5", "3" and "22" on the card 61. When a bingo player wins the game, the display includes an animation of the bingo player jumping up and shouting the word "Bingo". In the event that two bingo players achieve bingo at the same time and one of the bingo players is the one representing the game player, the bingo player representing the game player is chosen to be the winning player. Also, as shown in FIG. 7, a flashing bingo sign 70 indicates that the game has been won.

If the game player chooses a pattern of all squares on the perimeter, a prize of 2×total bet is awarded for each number that is drawn which falls within the pattern. A bonus is awarded if the selected bingo player 64.1 to 64.5 wins bingo in 20 or fewer balls being drawn. If the game player chooses a pattern of crosses, either vertical/horizontal or on the diagonal, a prize of 3×total bet is awarded for every number that is drawn that falls within the selected pattern. A bonus is awarded if the selected player 64.1 to 64.5 wins bingo in 12 or fewer balls being drawn. If the game player chooses a pattern which is a straight line, excluding the "wild" square, a prize of 4×total bet is awarded for every number that is drawn that falls within the selected pattern. A bonus is awarded if the selected player 64.1 to 64.5 wins bingo in 7 or fewer balls being drawn. If the selected player marks off no numbers during the bingo game, a consolation prize of 5×total bets is awarded. In each case the bonus may be a number of credits, a number of free games (with or without multiplier), a stand-alone progressive prize, or the like.

A stand-alone progressive prize may be awarded randomly during the feature as a "lucky door prize". In other words there may be a predetermined probability that the feature will award a progressive prize in addition to other features.

It is an advantage of the invention that the game player is given an element of choice and hence a feeling of control by being able to select the pattern and the bingo player. Additionally, it is an advantage of the invention to provide a bingo game where the bingo cards of the individual players are displayed simultaneously to a game player with all bingo cards having the same selected bingo card pattern. It is yet a further advantage of the invention that a bingo game provides a game player with a prize on each occasion that a numbered bingo ball is drawn corresponding to an entry that is contained in the bingo card selected by the game player. This increases the excitement of the game to include an element of competition between the player's selected card and the other, non-selected cards as the player is then effectively playing against the machine.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine having a display means and a game control means arranged to control images displayed on the display means, the game control means being operable to play a game of bingo, wherein the display means displays a plurality of bingo cards simultaneously, at least one, but not all, of said bingo cards being selected by a person playing the game in order for that person to play the game of bingo, non-selected cards continuing to be displayed on the display means during playing of the game of bingo by the player and the non-selected cards participating in the game of bingo such that a win determination for the person is dependent on outcomes associated both with the at least one selected card and the non-selected cards.

2. The gaming machine of claim 1 in which the game control means causes one representation of a bingo player to be displayed in association with each one of the bingo cards.

3. The gaming machine of claim 2 in which a selector is operable by the person playing the game (referred to as "the game player") to select at least one representation of a bingo player to represent the game player in the bingo game.

4. The gaming machine of claim 3 in which the representation of a bingo player selected by the game player to represent the game player is distinctively highlighted on the display means to indicate its role as representing the game player.

5. The gaming machine of claim 1 in which the indicia on each bingo card are arranged in a matrix and the playing of the bingo game requires the same pattern of indicia always to be completed to constitute a bingo game-winning result.

6. The gaming machine of claim 1 in which the indicia on each bingo card are arranged in a matrix and, as an initial step in the playing of the game, the game player is required to select one of the patterns of indicia to apply to the bingo cards, the selected pattern of indicia on all the displayed bingo cards then being the same.

7. The gaming machine of claim 1 in which a prize is awarded if a pattern of indicia on the game player's card is completed before the completion of the same pattern of indicia on any of the other, non-selected cards.

8. The gaming machine of claim 1 in which a prize is awarded if a pattern of indicia on the game player's card is completed within a predetermined number of bingo indicia draws.

9. The gaming machine of claim 1 in which a consolation prize is awarded to the game player if another bingo player's pattern of indicia is completed before any indicia have been marked off on the game player's card.

10. The gaming machine of claim 1 in which a bingo game caller is displayed on the display means.

11. The gaming machine of claim 1 in which an indicia board is displayed on the display means and as each bingo indicium is drawn during the game, the indicia board indicates the bingo indicium drawn.

12. The gaming machine of claim 1 in which each bingo indicium is carried on a representation of a ball.

13. The gaming machine of claim 12 in which a set of balls carrying the bingo indicia also includes at least one ball carrying a special function operator.

14. The gaming machine of claim 13 in which the special function is at least one of a multiplier function and a wild function.

15. The gaming machine of claim 1 in which a prize is awarded for each bingo indicium which is drawn and which corresponds to an indicium on the selected bingo card.

* * * * *